US010189554B1

(12) United States Patent
Wang et al.

(10) Patent No.: US 10,189,554 B1
(45) Date of Patent: Jan. 29, 2019

(54) ENCLOSURE COOLING FOR THERMAL MANAGEMENT OF UNMANNED AERIAL VEHICLES

(71) Applicant: QUALCOMM Incorporated, San Diego, CA (US)

(72) Inventors: Peng Wang, San Diego, CA (US); Vivek Sahu, San Diego, CA (US); Shujuan Wang, San Diego, CA (US); Don Le, San Diego, CA (US); Jon James Anderson, Boulder, CO (US); Chinchuan Chiu, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/645,940

(22) Filed: Jul. 10, 2017

(51) Int. Cl.
*B60H 3/00* (2006.01)
*B64C 1/06* (2006.01)
*B64C 39/02* (2006.01)
*B64C 1/00* (2006.01)

(52) U.S. Cl.
CPC .............. *B64C 1/06* (2013.01); *B64C 39/024* (2013.01); *B64C 2001/0081* (2013.01)

(58) Field of Classification Search
CPC . B64C 1/06; B64C 39/024; B64C 2001/0081; F42B 12/24; F42B 33/00; F42B 12/22; F42B 12/26; F42B 12/18; F42B 12/32
USPC .............................................. 165/44
See application file for complete search history.

(56) References Cited

U.S. PATENT DOCUMENTS

| 10,018,453 B1* | 7/2018 | McCoy ................... F42B 12/24 |
| 2013/0292085 A1 | 11/2013 | Smith et al. |
| 2014/0246544 A1 | 9/2014 | Bullard et al. |

FOREIGN PATENT DOCUMENTS

| CN | 106089438 A | 11/2016 |
| CN | 106252785 A | 12/2016 |
| CN | 205810969 U | 12/2016 |

* cited by examiner

*Primary Examiner* — Davis D Hwu
(74) *Attorney, Agent, or Firm* — Paradice and Li LLP (57) ABSTRACT

Arrangements described herein relate to apparatuses, systems, and methods for a housing of an unmanned aerial vehicle (UAV), the housing includes but is not limited to a metallic porous material having a shape of an enclosure of the UAV, and a phase change material (PCM) provided in at least a portion of the metallic porous material. The metallic porous material and the PCM are configured to passively cool the UAV.

24 Claims, 5 Drawing Sheets

ENCLOSURE COOLING FOR THERMAL MANAGEMENT OF UNMANNED AERIAL VEHICLES

BACKGROUND

Unmanned aerial vehicles (UAVs) typically have heat-generating components such as, but not limited to, Central Processing Units (CPUs), Graphics Processing Units (GPUs), memory units (e.g., Double Data Rate (DDR) memory units), wireless communication devices (e.g., Wireless Local Area Network (WLAN) devices, Wireless Wide Area Network (WWAN) devices, and the like), Global Positioning Systems (GPSs), Power Management Integrated Circuits (PMICs), Image Signal Processors (ISPs), cameras, sensors, batteries, and the like. The heat-generating components of the UAVs can generate a considerable amount of heat that may affect the operation of those components or other components of the UAV. Thus thermal management for UAVs can pose significant challenges, especially in certain environments of use. For example, high junction (e.g., chip/electronics) temperature, high ambient temperature (e.g., 40° C. on a hot day), thermal radiation from the sun, and the like are some factors that can substantially raise the temperature of a UAV. In addition, skin temperature (e.g., exterior contact temperature) also poses a major design constraint because designers and manufacturers typically request a maximum allowable skin temperature that is between 45° C. to 55° C., so that a user can comfortably touch and hold the UAV.

Traditional active solutions such as external fans and internal blowers consume power, add weight to the UAV, require maintenance, and often fail to achieve the desired results. Further, the traditional active solutions are unreliable, costly, space-inefficient, and noisy. Moisture, dust, and other contaminants can be introduced into the enclosed space of the UAV by fans and blowers, which can cause damage to sensitive electronic components enclosed in the UAV. In addition, the traditional active solutions constitute additional points of potential failure. Once the fans and/or blowers fail, the UAV can quickly overheat, leading to device shutdown, permanent electrical, permanent thermo-mechanical failure, and/or the like.

SUMMARY

In some implementations, a housing of an unmanned aerial vehicle (UAV) includes a metallic porous material having a shape of an enclosure of the UAV, and a phase change material (PCM) provided in at least a portion of the metallic porous material, wherein the metallic porous material and the PCM are configured to passively cool the UAV.

In some implementations, the metallic porous material and the PCM enclose one or more heat-generating components of the UAV.

In some implementations, the PCM is infused in the portion of the metallic porous material. Another portion of the metallic porous material is free of the PCM.

In some implementations, the metallic porous material and the PCM form the enclosure of the UAV. The enclosure includes a first portion and a second portion.

In some implementations, the first portion of the enclosure includes the metallic porous material free of the PCM.

In some implementations, the first portion of the enclosure forms an exterior surface of the enclosure. The first portion is arranged to face away from heat-generating components of the UAV.

In some implementations, pores of the metallic porous material on the first portion of the enclosure are configured to receive ambient air for cooling by convection.

In some implementations, the second portion of the enclosure includes the portion of the metallic porous material with the PCM provided.

In some implementations, the second portion forms an interior surface of the enclosure. The second portion is arranged to face heat-generating components of the UAV.

In some implementations, the second portion is arranged to be adjacent to heat-generating components.

In some implementations, the second portion is configured for cooling by at least phase changing of the PCM.

In some implementations, the housing further includes a support structure configured to support the metallic porous material and the PCM, wherein the support structure is made of one or more of plastic, polystyrene foam, wood, metal, or metal alloy.

In some implementations, a UAV includes one or more heat-generating components, and an enclosure made of a PCM provided in at least a portion of a metallic porous material, wherein the enclosure encloses at least the one or more heat-generating components.

In some implementations, a portion of the metallic porous material is free from the PCM.

In some implementations, the enclosure includes a first portion and a second portion. The first portion of the enclosure includes the metallic porous material free of the PCM. The second portion of the enclosure includes the portion of the metallic porous material with the PCM provided.

In some implementations, the first portion of the enclosure forms an exterior surface of the enclosure. The first portion is arranged to face away from the heat-generating components of the UAV.

In some implementations, the UAV further includes propellers. The first portion is configured for forced convective air cooling driven by the propellers.

In some implementations, pores of the metallic porous material on the first portion of the enclosure are configured to receive ambient air for cooling by convection.

In some implementations, the second portion forms an interior surface of the enclosure. The second portion is arranged to face the heat-generating components of the UAV.

In some implementations, the second portion is arranged to be adjacent to the heat-generating components.

In some implementations, the second portion is configured for cooling by phase changing of the PCM.

In some implementations, the UAV further includes a support structure configured to support the enclosure, wherein the support structure is made of one or more of plastic, polystyrene foam, wood, metal, or metal alloy.

In some implementations, the support structure is configured to support the one or more heat-generating components.

In some implementations, the one or more heat-generating components include one or more of a Central Processing Unit (CPU), Graphics Processing Unit (GPU), memory unit, wireless communication device, Global Positioning System (GPS), Power Management Integrated Circuit (PMIC), Image Signal Processor (ISP), camera, sensor, or battery.

In some implementations, a housing of a UAV includes metallic porous means configured to have a shape of an enclosure of the UAV, and a PCM means that is provided in at least a portion of the metallic porous means.

In some implementations, a method for providing an enclosure for a UAV includes providing a PCM to at least a portion of a metallic porous material to obtain a PCM-containing metallic porous material and enclosing heat-generating components of the UAV with the PCM-containing metallic porous material.

In some implementations, providing the PCM to at least the portion of the metallic porous material includes placing the PCM on top of the metallic porous material, heating the PCM to a melting point of the PCM, infusing the PCM in the portion of the metallic porous material, determining that the infusing is completed, and allowing the PCM to cool to obtain a PCM-containing metallic porous material.

In some implementations, the method further includes configuring a PCM-free portion of the PCM-containing metallic porous material to receive ambient air for cooling by convection.

In some implementations, the method further includes arranging the PCM-free portion of the PCM-containing metallic porous material to face away from the heat-generating components.

In some implementations, the method further includes arranging the portion of the PCM-containing metallic porous material with the PCM to face the heat-generating components.

BRIEF DESCRIPTION OF THE DRAWINGS

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

DETAILED DESCRIPTION

Various examples will be described in detail with reference to the accompanying drawings. Wherever possible, the same reference numbers may be used throughout the drawings to refer to the same or like parts. Different reference numbers may be used to refer to different, same, or like parts. References made to particular examples and implementations are for illustrative purposes, and are not intended to limit the scope of the disclosure or the claims.

Arrangements described herein relate to systems, apparatuses, and methods for passive thermal management of UAVs using a combination of a metallic porous material and a phase change material (PCM). In particular, a UAV's enclosure, skin, or outer shell may be made of the metallic porous material infused with the PCM. The PCM is infused, injected, loaded, or otherwise filled at least partially into the metallic porous material, to form a PCM-infused metallic porous hybrid material used as the enclosure of the UAV. In other words, the PCM-infused metallic porous hybrid material may be shaped as an enclosure of a UAV, or as one or more portions of an enclosure of a UAV. The resulting enclosure material can reduce junction temperature and skin temperature through passive cooling in the manner described herein.

Example arrangements described herein provide a passive thermal solution that does not require application of power for cooling heat-generating components (e.g., electrical components) of the UAV. Accordingly, power consumption can be reduced. In addition, the PCM-infused metallic porous material can be lightweight, and the PCM-infused metallic porous hybrid material can also function as a UAV enclosure or one or more portions of a UAV enclosure. Furthermore, given that the PCM-infused metallic porous hybrid material is configured as the UAV enclosure (or one or more portions of the UAV enclosure), the PCM-infused metallic porous hybrid material may have a large surface area that can be exposed to airflow during normal operation of the UAV, thus significantly improving convective air cooling. The PCM can absorb heat as the PCM changes phase from a solid phase to a liquid phase. The PCM in the PCM-infused metallic porous hybrid material can provide a passive cooling mechanism even when there is no or low air flow around the UAV (e.g., when the UAV has landed or is in an enclosed environment, and the like).

Figure 1:
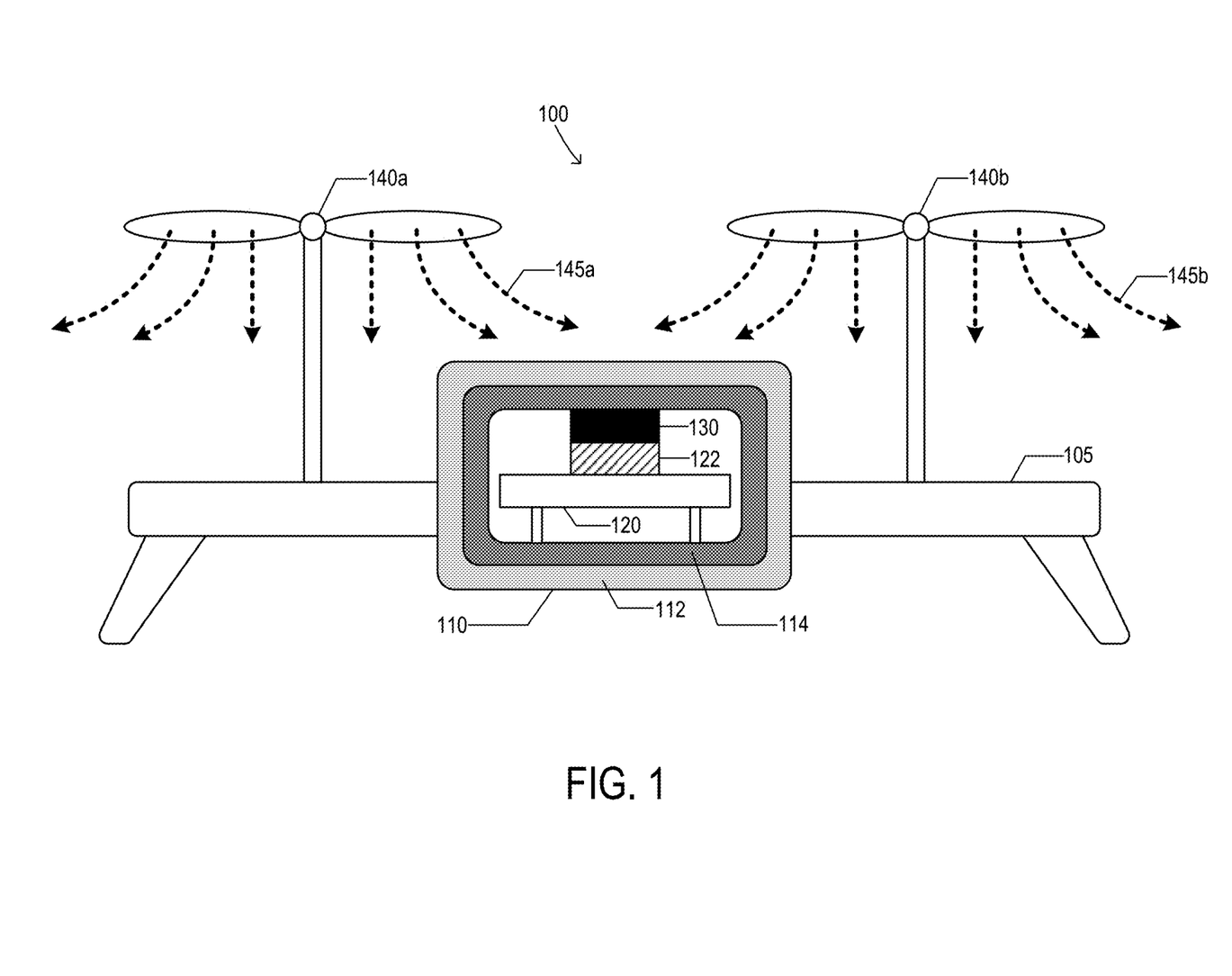
FIG. 1 is a schematic diagram illustrating a unmanned aerial vehicle (UAV) having an enclosure capable of passively cooling the UAV according to some implementations.

FIG. 1 is a schematic diagram illustrating a unmanned aerial vehicle (UAV) 100 having an enclosure 110 capable of passively cooling the UAV 100 according to some implementations. FIG. 1 shows a cross-section view of the UAV 100. Referring to FIG. 1, the UAV 100 may have a support structure 105 configured to support one or more enclosures 110 (one enclosure 110 is shown in FIG. 1), one or more motive devices (such as, but not limited to propellers 140a and 140b), one or more of components enclosed by the enclosure 110, and/or other suitable UAV components. The support structure 105 may include one or more frame structures or other support structure, made of plastic, polystyrene foam, wood, metal, metal alloy, composite material and/or the like. The enclosure 110 may be a skin or an outer shell of the UAV 110 that encloses, at least partially, some components of the UAV 110. While FIG. 1 shows that the enclosure 110 has a cuboid shape as an example, one or ordinary skill in the art can appreciate that the enclosure 110 can take any suitable shape.

In some implementations, components of the UAV 110 enclosed by the enclosure 110 may include electronic components that generate heat as part of their normal operation. Such electronic components are also referred to as heat-generating components. Examples of the heat-generating components include, but are not limited to, Central Processing Units (CPUs), Graphics Processing Units (GPUs), memory units (e.g., Double Data Rate (DDR) memory units), wireless communication devices (e.g., Wireless Local Area Network (WLAN) devices, Wireless Wide Area Network (WWAN) devices, and the like), Global Positioning Systems (GPSs), Power Management Integrated Circuits (PMICs), Image Signal Processors (ISPs), cameras, sensors, batteries, and the like. At least some of the above-noted heat-generating components may be employed by the UAV for providing flight control of the UAV and communications during flight. In the non-limiting example shown in FIG. 1, the enclosure 110 may enclose a Printed Circuit Board (PCB) 120 and a chip 122. The PCB 120 and the chip 122 may support one or more of the heat-generating components described herein. The enclosure 110 may also enclose one or more metal slugs 130 (one metal slug is shown in FIG. 1) that are thermally coupled to the chip 122 (or other heat-generating component) for dissipating heat generated by the chip 122 (or other heat-generating component). The metal slug 130 may be made of copper, aluminum, and the like. The metal slug 130 may function as a thermal conductor that transfers heat from the chip 122 to the enclosure 110 for passive cooling. In some arrangements, the enclosure 110 may also enclose one or more components that do not generate heat.

The enclosure 110 may be made of the PCM-infused metallic porous hybrid material. In some arrangements, the PCM-infused metallic porous hybrid material may be a metallic porous material having a PCM at least partially infused therein. The metallic porous material (e.g., an open-cell porous metal material) may have a very large surface area (e.g., high surface-area-to-volume ratio) and high thermal conductivity. The large surface area can improve convection cooling by airflow. The high thermal conductivity can promote improved conductive cooling (for instance, as compared to plastic materials).

In some examples, the metallic porous material may be made of aluminum, copper, or another metal/metal alloy that has higher thermal conductivity than that of plastic, polystyrene foam, wood, and the like. The metallic porous material may have a pore size of 100-500 µm or other suitable pore size. The PCM may be a substance that has high latent heat and is capable of absorbing and releasing large amount of energy in the form of heat as the PCM changes from a solid state to a liquid state, or from the liquid state to the solid state, respectively. The PCM may be made of paraffin wax or another suitable material (e.g., salt hydrates, Eutectics, Hygroscopic materials, and the like). Illustrating with a non-limiting example, the PCM may be made of paraffin wax.

A suitable PCM material may be selected based on the melting point of the PCM. In an example in which the design constraints dictate that the maximum allowable skin temperature of the UAV 100 (the enclosure 110) is X°, a PCM having a melting point of X° or approximately X° may be selected. Thus, implementations herein typically correspond to selecting PCMs with melting points between 35° and 85°. This is because designers typically prefer the maximum allowable skin temperature of the UAV 100 to be approximately 35°, and the maximum allowable junction temperature of the UAV 100 to be approximately 85°. In other examples, the melting point of the PCM may be between 27° and 90°, or within another suitable range.

In some arrangements, the metallic porous material may be formed into a shape of the enclosure 110. For example, the metallic porous material may be a single slab or sheet. The metallic porous material may have a surface of a first portion 112 facing outward. The first portion 112 may form an exterior surface (side) of the UAV 100 (an exterior surface of the enclosure 110). In other words, the first portion 112 of the enclosure 110 may also be the first portion 112 of the metallic porous material. The first portion 112 may be arranged to face away from the heat-generating components of the UAV. As shown, the first portion 112 may face away from the PCB 120, the chip 122, and the metal slug 130.

In some arrangements, the first portion 112 may not have any PCM infused therein. In other words, the first portion 112 of the enclosure 110 may include open-cell pores of the metallic porous material free of the PCM. As such, air flow over the exterior surface of the enclosure 110 can be utilized for ambient passive cooling by convection, especially when the UAV 100 is moving. In other words, the first portion 112 may be configured by use of the metallic porous material to achieve external surface area to enhance forced convective air cooling. In addition to the airflow generated due to the motion of the UAV 100, the propellers 140a and 140b of the UAV 110 may generate downwash airflow 145a and 145b, respectively, when the propellers 140a and 140b are activated. The first portion 112 or at least a portion thereof may be arranged to be adjacent to and/or to face the propellers 140a and 140b to receive the downwash airflow 145a and 145b for improved ambient passive cooling by convection. In other words, the first portion 12 may be configured for forced convective air cooling driven by the propellers 140a and 140b. Accordingly, the open-cell pores of the metallic porous material on the first portion 112 are configured to receive ambient air for cooling by convection.

The enclosure 110 may have a second portion 114. The second portion 114 may be opposite to the first portion 112. The metallic porous material on the first portion 112 and the second portion 114 may be a unitary, unseparated metallic porous material. In other words, the second portion 114 of the enclosure 110 may also be the second portion 114 of the metallic porous material. The metallic porous material on the second portion 114 may have the PCM infused therein. The second portion 114 may correspond to the depth-wise infusion of the PCM. That is, a portion of a thickness of the metallic porous material in slab or sheet form having the PCM infused may be the second portion 114 while another portion of the thickness free of the PCM may be the first portion 112. The second portion 114 may form an interior surface (side) of UAV 110 (an interior surface of the enclosure 110). The second portion 114 may be arranged to face the heat-generating components as well as other components (e.g., a metal slug) dissipating heat from the heat-generating components of the UAV 110. As shown, the second portion 114 may be arranged to face the PCB 120, the chip 122, and the metal slug 130. In some arrangements, the second portion 114 may be arranged to be adjacent to one or more heat-generating electronics (e.g., the PCB 120, the chip 122, and the like) and/or a metal slug (e.g., the metal slug 130) dissipating heat from the heat-generating components.

In some arrangements, the second portion 114 may be arranged to contact or to abut one or more heat-generating component (e.g., the PCB 120, the chip 122, and the like) and/or a metal slug (e.g., the metal slug 130) dissipating heat from the heat-generating components. While the term "metal slug" is used, one or ordinary skill in the art can appreciate that other thermal connections (e.g., a heat sink, a Thermal Interface Material (TIM), a thermal pad, thermal paste, and the like) with good thermal conductivity can be used to transfer heat from the heat-generating components (e.g., the PCB 120, the chip 112, and the like) to the second portion 114. The metal slug 130 absorbs heat dissipated by the PCB 120 and the chip 122 by at least conduction. As shown, the second portion 114 may abut the metal slug 130 to absorb heat origination from the PCB 120 and the chip 112 by conduction. The second portion 114 may be configured for cooling by at least the phase changing of the PCM, which is also known as transient cooling. For example, by contacting a heat-generating component or a metal slug dissipating heat for the heat-generating component, the PCM in the second portion 114 can absorb the heat originating from the heat-generating component by phase changing. The metallic porous material on the second portion 114 can facilitate heat conduction throughout the PCM, given that the PCM is infused in the metallic porous material which has high thermal conductivity. By distributing heat throughout the PCM, the rate of passive cooling can be improved.

In other examples, at least a part of the enclosure 110 may be made of other materials (e.g., plastic, polystyrene foam, wood, metal/metal alloy, or the like) that provide structural support. In some arrangements, such part of the enclosure 110 may be configured to be fixed or otherwise attached to the support structure 105. Such part of the enclosure 110 may be a part of the support structure 105 in some arrangements. The enclosure 110 may include one or more sections (e.g., sections adjacent heat-generating components or their metal slugs) that are made of metallic porous material infused or partially infused with PCM as described.

Accordingly, by configuring the enclosure 110 to passively cool the components 120, 122, and 130 of the UAV 100, active thermal management solutions such as fans and blowers are not needed. As such, weight of the UAV 100 can be reduced given that the enclosure 110 can perform the dual functions of an outer shell for the components 120, 122, and 130 and passive thermal management. By eliminating the need for active thermal management solutions, potential points of failures associated with the active thermal management solutions can be eliminated. In other arrangements, the active thermal management solution (e.g., fans, blowers, and the like) may be used in conjunction with the passive thermal management arrangements described herein.

Figure 2A:
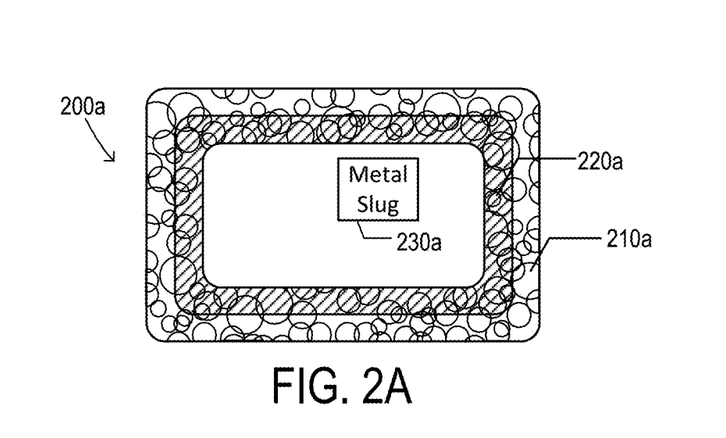
FIG. 2A is a schematic diagram illustrating a configuration of an enclosure according to some implementations.
Figure 2B:
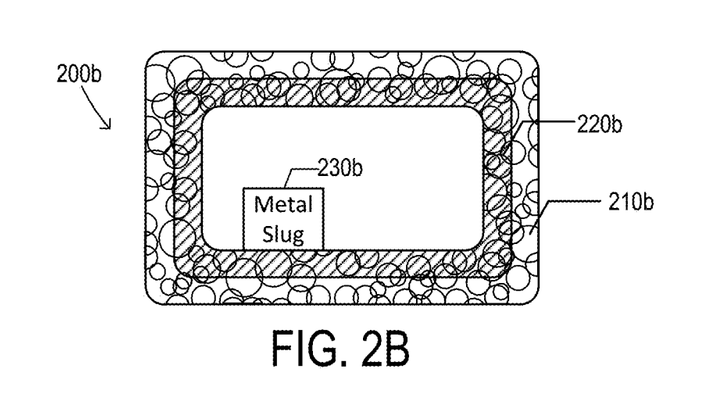
FIG. 2B is a schematic diagram illustrating a configuration of an enclosure according to some implementations.
Figure 2C:
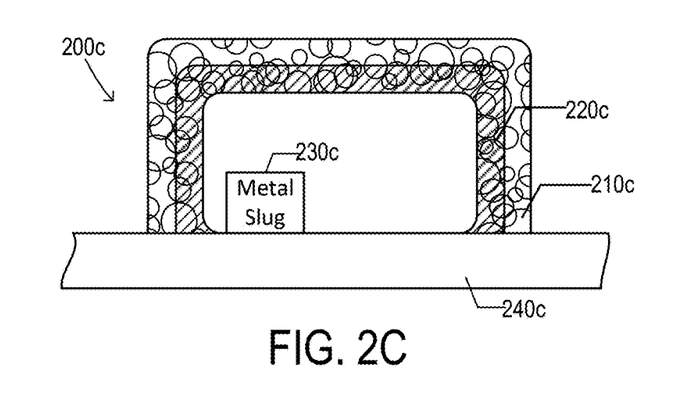
FIG. 2C is a schematic diagram illustrating a configuration of an enclosure according to some implementations.
Figure 2D:
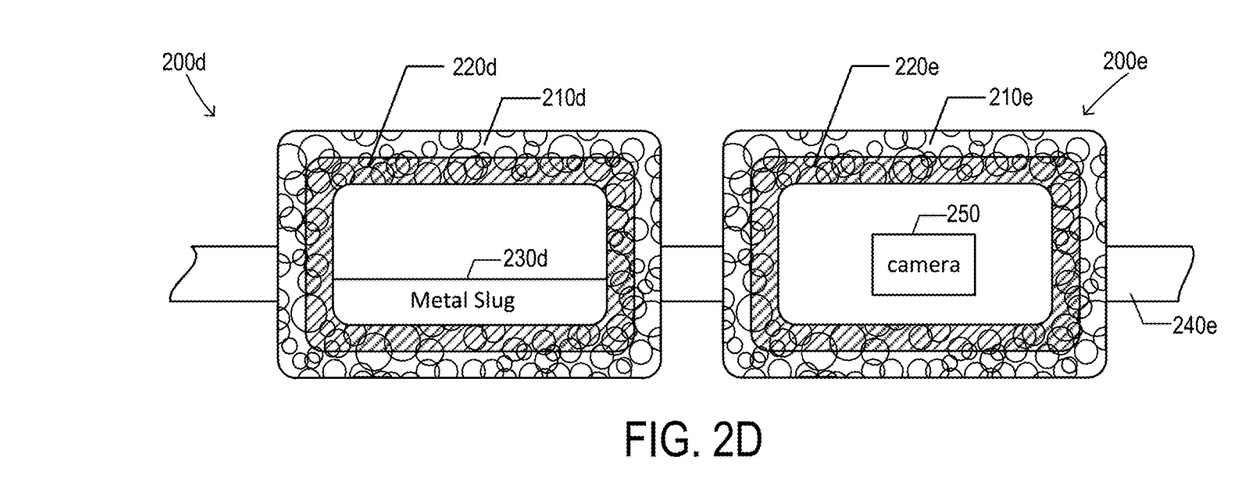
FIG. 2D is a schematic diagram illustrating a configuration of enclosures according to some implementations.

FIG. 2A is a schematic diagram illustrating a configuration of an enclosure 200a according to some implementations. FIG. 2B is a schematic diagram illustrating a configuration of an enclosure 200b according to some implementations. FIG. 2C is a schematic diagram illustrating a configuration of an enclosure 200c according to some implementations. FIG. 2D is a schematic diagram illustrating a configuration of enclosures 200d and 200e according to some implementations. Referring to FIGS. 1-2D, the enclosures 200a-200e may be an enclosure such as, but not limited to, the enclosure 110.

Each of the enclosures 200a-200e may enclose, at least partially, a respective one of metal slugs 230a-230d and camera 250. The heat-generating components thermally coupled to the metal slugs 230a-230d are not shown for clarity. Each of the enclosures 200a-200e may have a respective one of first portions 210a-210e, each of which is a portion (thickness) such as, but not limited to, the first portion 112. Each of the enclosures 200a-200e may have a respective one of second portions 220a-220e, each of which is a portion such as, but not limited to, the second portion 114. Each of the metal slugs 230a-230d may be a metal slug such as, but not limited to, the metal slug 130. Each of support structures 240c and 240e may be a support structure such as, but not limited to, the support structure 105.

In some arrangements, each of the enclosures 200a-200e may be made from the metallic porous material with the PCM at least partially infused therein. Each of the first portions 210a-210e may be a PCM-free portion of the metallic porous material of a respective one of the enclosures 200a-200e. Each of the first portions 210a-210e may face away from a respective one of the metal slugs 230a-230d and the camera 250. Each of the first portions 210a-210e may form an exterior, porous surface of a respective one of the enclosures 200a-200e. Each of second portions 210a-210e may be a PCM-infused portion of the metallic porous material of a respective one of the enclosures 200a-200e. Each of the second portions 220a-220e may face a respective one of the metal slugs 230a-230d and the camera 250. Each of the second portions 220a-220e may form an interior surface of a respective one of the enclosures 200a-200e.

With respect to the enclosure 200a, the second portion 220a of the enclosure 200a may be adjacent to the metal slug 230a. The second portion 220a may be separated from the metal slug 230a. As such, heat from the metal slug 230a may arrive at the second portion 220a by conduction.

With respect to the enclosure 200b, the second portion 220b of the enclosure 200b may abut or contact the metal slug 230b. As such, heat from the metal slug 230a may arrive at the second portion 220a by conduction due to the contact.

The enclosure 200c and the support structure 240c may enclose the metal slug 230c and heat-generating components (not shown) thermally coupled to the metal slug 230c. The enclosure 200c may partially enclose the metal slug 230c and the heat-generating components (not shown). The support structure 240c may structurally support the metal slug 230c in some arrangements. The support structure 240c may structurally support some or all of the heat-generating components (not shown) in some arrangements. The second portion 220c of the enclosure 200c may be adjacent to and separate from the metal slug 230c. In this regard, heat from the metal slug 230c may arrive at the second portion 220c by convection.

In some arrangements, a UAV may include two or more enclosures made from the PCM-infused metallic porous hybrid material for passive thermal management in the manner described herein. For instance, the support structure 240e may support the enclosures 200d and 200e. The enclosures 200d and 200e may enclose different components. For instance, the enclosure 200d may enclose a metal slug 230d and heat-generating components (not shown) thermally coupled to the metal slug 230d. The second portion 220d of the enclosure 200d may abut or contact the metal slug 230d (for example, on three walls of the second portion 200d). As such, heat from the metal slug 230d may arrive at the second portion 220d by conduction due to the contact. The enclosure 200e may enclose a camera 250. The second portion 220e may be separated from or attached to the camera 250. As such, heat from the camera 250 may arrive at the second portion 220e by conduction. By implementing two separate enclosures 200d and 200e, the surface-to-volume ratio of the enclosures 200d and 200e can further improve, thus receiving more air for ambient passive cooling by convection.

Figure 3:
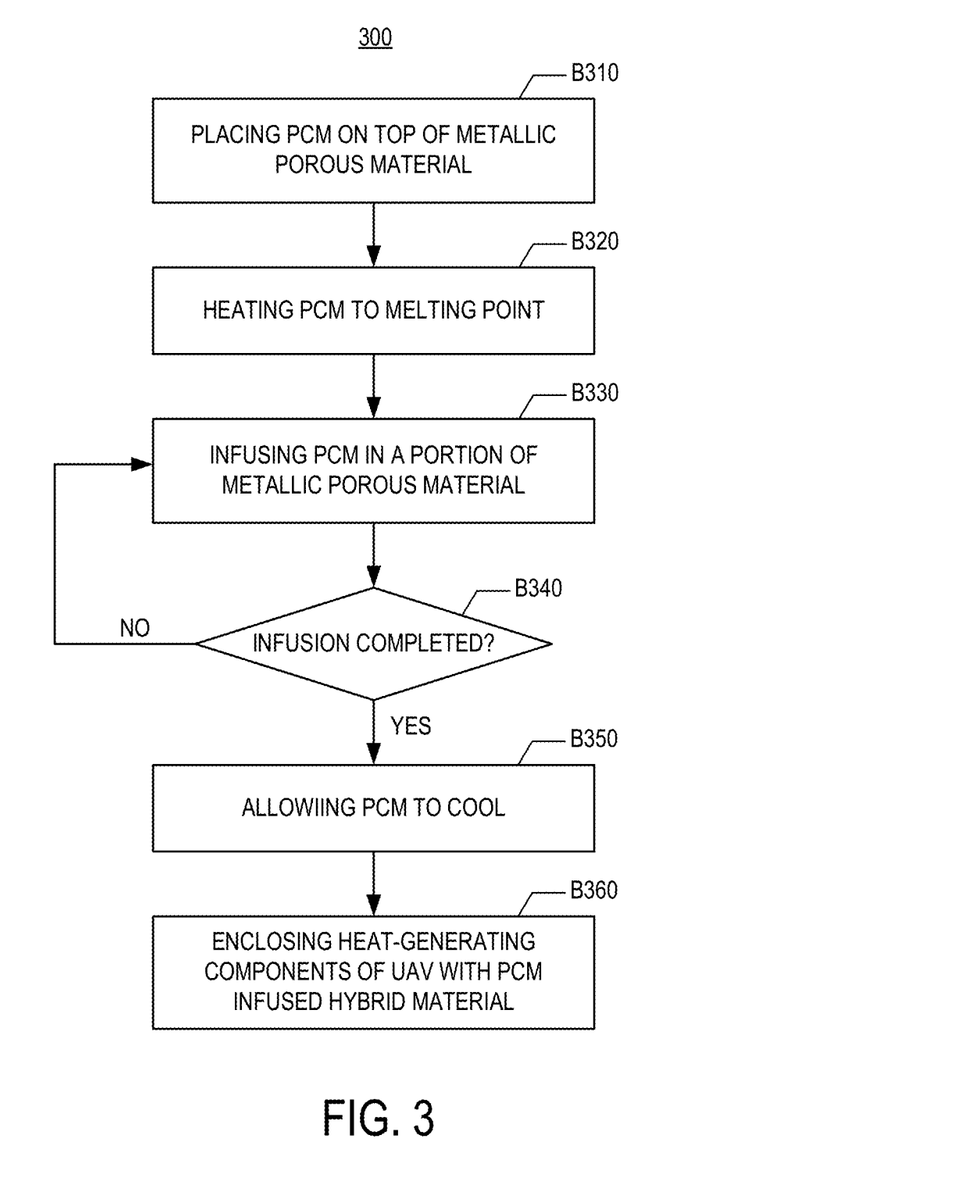
FIG. 3 is a flow diagram illustrating a method for providing an enclosure of a UAV according to some implementations.
Figure 4A:
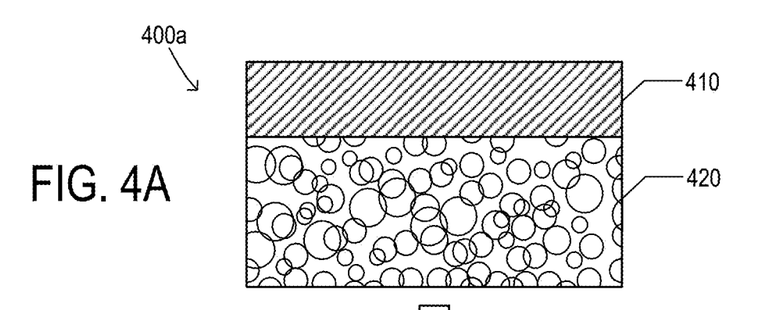
FIGS. 4A and 4B are schematic diagrams illustrating partially infusing a phase change material (PCM) in a metallic porous material according to some implementations.
Figure 4B:
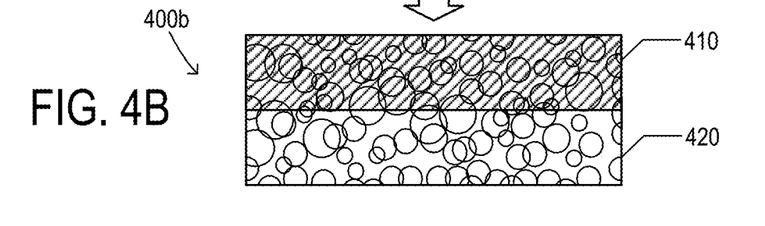

FIG. 3 is a flow diagram illustrating a method 300 for providing an enclosure of a UAV according to some implementations. FIGS. 4A and 4B are schematic diagrams illustrating partially infusing a PCM 410 in a metallic porous material 420 according to some implementations. Referring to FIGS. 1-4B, the method 300 may be implemented to provide the enclosures 110 and 200a-200e in some examples.

At block B310, the PCM 410 may be placed on top of the metallic porous material 420. Illustrating with a non-limiting example, the PCM 410 may be one or more sheets of paraffin wax (or another suitable PCM material) that is stacked on top of a slab or sheet of the metallic porous material 420 in a configuration 400a. In some arrangements, block B310 may be executed on the metallic porous material 420 that is already shaped as an enclosure. For example, the metallic porous material 420 may be a single slab or sheet that is bent, molded, or formed into the shape of the enclosure to form the skin of the enclosure. In other arrangements, block B310 may be executed on the metallic porous material 420 that is yet to be shaped as an enclosure.

At block B320, the PCM 410 may be heated to an associated melting point. For instance, the stacked material (e.g., in the configuration 400a) may be placed in an oven for melting the PCM 410. At block B330, PCM 410 may be infused depth-wise in a portion of the metallic porous material 420. For example, in liquid form, the melted PCM 410 may begin permeating into pores of the metallic porous material 420 due to gravity. In other examples, mechanism other than gravity may be used to draw or press the melted PCM 410 into the metallic porous material 420. For instance, a mechanical or hydraulic press may be employed to apply pressure to force the melted PCM 410 into the metallic porous material 420. In another example, a vacuum may be employed to suction air from a side of the metallic porous material 420 that is opposite to the side on which the PCM 410 is placed, to draw the melted PCM 410 into the metallic porous material 420.

At block B340, a determination may be made as to whether the infusion has been completed. In some arrangements, infusion may be completed responsive to determining that a first thickness of the PCM 410 in solid form is approximately the same as a second thickness of the PCM 410 in liquid form as infused in the metallic porous material 420. In some arrangements, infusion may be completed responsive to determining that no PCM 410 (in either liquid or solid form) remains on top of the metallic porous material 420. The determination at block B340 may be made by a human operator, or by a processing circuit (including a suitable processor and memory) performing graphical analysis image/videos captured by cameras.

Responsive to determining that the infusion has not been completed (B340:NO), the method 300 returns to block B330. On the other hand, responsive to determining that the infusion has been completed (B340:YES), the PCM 410 is allowed to cool at block B350. The PCM 410 may cool within the metallic porous material 420. After the PCM 410 has been completely infused in the metallic porous material 420, the PCM 410 and the metallic porous material 420 may form a PCM-infused hybrid material shown in a configuration 400b. The PCM-infused hybrid material may have one portion (e.g., an upper portion) free of the PCM 410 and another portion (e.g., a lower portion) infused with the PCM 410.

At block B360, the PCM-infused hybrid material may be used to enclose the heat-generating components in the manner described herein. In the arrangements in which the metallic porous material has yet to be shaped as the enclosure, the PCM-infused hybrid material may be shaped (e.g., bent, molded, or formed) into the shape of the enclosure to form the skin of the enclosure, as a part of block B360.

The PCM 410 does not leak out from the metallic porous material 420 because the metallic porous material 420 functions like a sponge to absorb and retain the PCM 410. The metallic porous material 420 transfers heat throughout the PCM 410 by conduction to increases the rate of cooling by the PCM 410. The PCM 410 may further reinforce the metallic porous material 420, thus enabling the sufficient structural integrity to support a UAV. The resulting PCM-infused hybrid material may have both structural and cooling functions, thus reducing weight and power consumption.

While the current disclosure utilizes UAVs as examples, one of ordinary skill in the art can appreciate that other mobile robots (e.g., Unmanned Marine Vehicles (UMVs), Unmanned Surface Vehicles (USVs), and the like) can likewise use the enclosures described herein for passive thermal management. Water is similar to air in that water can also provide ambient passive cooling, as water can be received by the pores of the metallic porous material.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A housing of an unmanned aerial vehicle (UAV), comprising:
   a metallic porous material comprising a first porous portion and a second porous portion, the metallic porous material configured to enclose one or more components of the UAV; and
   a phase change material (PCM), wherein pores of the first porous portion are free of the PCM and pores of the second porous portion are filled with the PCM,
   wherein the metallic porous material and the PCM are configured to passively cool the UAV.

2. The housing of claim 1, wherein the metallic porous material are configured to enclose one or more heat-generating components of the UAV.

3. The housing of claim 1, wherein
   the first porous portion of the metallic porous material is configured to form an exterior surface of the housing; and
   the second porous portion of the metallic porous material is configured to form an interior surface of the housing.

4. The housing of claim 1, wherein pores of the first porous portion of the metallic porous material are configured to receive ambient air for cooling by convection.

5. The housing of claim 3, wherein
   the second porous portion of the metallic porous material is configured to face toward one or more heat-generating components of the UAV.

6. The housing of claim 3, wherein the second porous portion of the metallic porous material is configured to contact one or more heat-generating components of the UAV.

7. The housing of claim 1, further comprising:
   a support structure configured to support the metallic porous material and the PCM, wherein the support structure is made of one or more of plastic, polystyrene foam, wood, metal, or metal alloy.

8. An unmanned aerial vehicle (UAV), comprising:
   one or more heat-generating components;
   an enclosure comprising a first porous portion of a metallic porous material and a second porous portion of the metallic porous material, the enclosure configured to enclose at least the one or more heat-generating components; and
   a phase change material (PCM), wherein pores of the first porous portion are free of the PCM and pores of the second porous portion are filled with the PCM.

9. The UAV of claim 8, wherein:
   the first porous portion of the metallic porous material is configured to form an exterior surface of the enclosure and face away from the one or more heat-generating components.

10. The UAV of claim 8, further comprising propellers, wherein the first porous portion of the metallic porous material is configured to receive forced air driven by the propellers.

11. The UAV of claim 8, wherein the second porous portion of the metallic porous material is configured to face toward the one or more heat-generating components of the UAV.

12. The UAV of claim 8, wherein the second porous portion of the metallic porous material is configured to contact the one or more heat-generating components.

13. The UAV of claim 8, wherein the second porous portion of the metallic porous material is configured to cool the UAV via a phase change of the PCM.

14. The UAV of claim 8, further comprising:
   a support structure configured to support the enclosure, wherein the support structure is made of one or more of plastic, polystyrene foam, wood, metal, or metal alloy.

15. The UAV of claim 8, wherein the one or more heat-generating components comprise at least one of a Central Processing Unit (CPU), Graphics Processing Unit (GPU), memory unit, wireless communication device, Global Positioning System (GPS), Power Management Integrated Circuit (PMIC), Image Signal Processor (ISP), camera, sensor, or a battery.

16. A housing of an unmanned aerial vehicle (UAV), comprising:
   a means for enclosing one or more heat-generating components of the UAV via a metallic porous material, wherein pores of a first porous portion of the metallic porous material are free of a phase change material (PCM) and pores of a second porous portion of the metallic porous material are filled with the PCM.

17. A method for providing an enclosure for an unmanned aerial vehicle (UAV), comprising:
  providing a phase change material (PCM) infused metallic porous hybrid material comprising a first porous portion and a second porous portion, wherein pores of a first porous portion are free of the PCM and pores of the second porous portion are filled with the PCM; and
  enclosing heat-generating components of the UAV with the PCM infused metallic porous hybrid material.

18. The method of claim 17, wherein providing the PCM infused metallic porous hybrid material comprises:
  placing the PCM on top of a metallic porous material;
  heating the PCM to a melting point of the PCM;
  infusing the PCM into the second porous portion;
  determining that the infusing is complete; and
  allowing the PCM to cool to obtain the PCM infused metallic porous hybrid material.

19. The method of claim 17, wherein the first porous portion receives ambient air for cooling by convection.

20. The method of claim 19, further comprising:
  configuring the first porous portion to face away from the heat-generating components.

21. The method of claim 17, further comprising:
  configuring the second porous portion to face toward the heat-generating components of the UAV.

22. The housing of claim 1, wherein the PCM is a paraffin wax.

23. The housing of claim 1, wherein the PCM is selected to have a melting temperature based on a maximum allowable skin temperature of the UAV.

24. The housing of claim 1, wherein the PCM is selected to have a melting temperature based on a maximum allowable junction temperature associated with the UAV.

* * * * *